March 26, 1940.                C. R. HUBBARD                2,194,942
                        ARMORED MACHINERY PACKING
                           Filed July 13, 1939

INVENTOR
Cecil R. Hubbard,
BY
Fraser, Myers & Manley
ATTORNEYS.

Patented Mar. 26, 1940

2,194,942

UNITED STATES PATENT OFFICE 2,194,942

ARMORED MACHINERY PACKING

Cecil R. Hubbard, Palmyra, N. Y., assignor to The Garlock Packing Company, Palmyra, N. Y., a corporation of New York Application July 13, 1939, Serial No. 284,282

5 Claims. (Cl. 288—12)

This invention relates to improvements in armored machinery packings, and is a specific variation or development of the flexible gasket disclosed and claimed in my prior patent, No. 2,066,270, of December 29, 1936. It is an object of the present invention to provide any desired part of a gasket having a plastic body portion, which is designed to be subjected to exacting conditions of service exceeding those to which other parts need be exposed, with a shield of a character such as to prevent cold flow or extrusion of the plastic material and to protect the plastic material from injury which would result from exposure to the high temperature or deleterious chemical elements of the fluid within the structure a joint of which is sealed by the gasket, without materially impairing the flexibility of the gasket and without the necessity of resorting to the tubular shield construction disclosed in my prior patent.

In the prior art will be found examples of gaskets having parts protected by shields corresponding in some respects with the one to be herein disclosed and claimed. As was explained in my prior patent, it has been proposed to make such shields of sheet lead or of canvas, or to use for such purpose a helix or coil of wire, but, as was also explained, such constructions were found to be defective in one respect or another, and the tubular construction of my prior patent was resorted to in an attempt to provide an armored gasket having the flexibility of gaskets of the prior art to which reference was made and at the same time having the greater strength necessary to satisfactorily resist cold flow or extrusion and otherwise protect the plastic element of the gasket from the exacting conditions of service to which such an article may be subjected.

It is the purpose of the present invention to provide a satisfactory shield for a gasket which will have all the meritorious properties of the one described and claimed in my prior patent, but which can be readily constructed by superimposing simple elements cut from ribbonlike strips of thin sheet material, as distinguished from the tubular braided construction of the invention of my prior patent.

In the accompanying drawing illustrating the preferred form of the invention herein to be disclosed and claimed—

Figure 5:
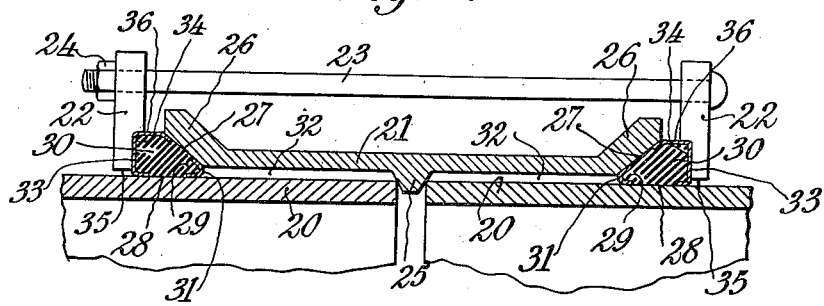
Fig. 5 is a cross-sectional view of parts of a pipe connection having joints sealed by armored gaskets each embodying the invention.

The part of a pipe connection illustrated by Fig. 5 is one example only of many mechanical constructions having joints which might be sealed by gaskets or armored packings embodying the invention to be hereinafter set forth. It comprises satisfactory means whereby a pair of pipe ends 20, 20 may be secured together by a cylindrical coupling 21, a pair of clamping rings 22, and a series of bolts and nuts, 23 and 24 respectively, whereby the clamping rings may be forcibly drawn towards each other.

The coupling 21 may preferably be provided with an inwardly directed, central, annular shoulder 25, which may serve as a stop for the opposed ends of the pipes 20, and the opposite ends of the coupling may be provided with inclined flanges 26, the inner flaring or conical walls 27 of which may cooperate with adjacent cylindrical portions 28 of the pipe ends to provide annular channels of a form adapted to receive annular wedge-like portions 29 of a pair of armored gaskets 30 embodying the invention here under consideration.

Gaskets intended for use in sealing joints of a pipe connection such as that illustrated by Fig. 5 will preferably be provided with shields 31 to protect the entering margins of the wedge-like portions 29 of the gaskets which face the joints 32 between the pipe ends and the coupling, and such gaskets may also be preferably provided with shields 33 to protect the heels or butt ends of the gaskets which more contact with the clamping rings 22.

The inner faces of the clamping rings 22 adjacent the surfaces of the pipe ends 20 may preferably be provided with annular recesses 34 to receive the outer angular portions of the butt ends of the gaskets, and the shields 33 will be so disposed as to reinforce and protect surface portions of the gaskets along the joints 35 between the clamping rings 22 and the pipe ends 20 and the joints 36 between the clamping rings 22 and the flared flanges 26 of the coupling.

Figure 1:
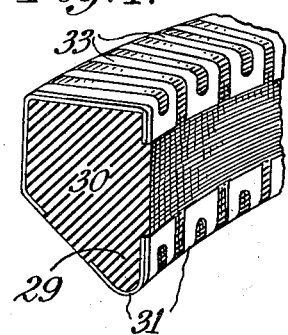
Figure 1 is a fragmentary view, partly in cross section and partly in perspective, of an armored gasket embodying the invention.
Figure 2:
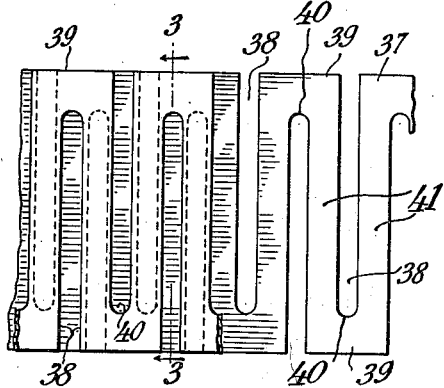
Fig. 2 is a fragmentary plan view of superimposed elements such as are used in making shields for the armored gasket illustrated by Fig. 1.
Figure 3:
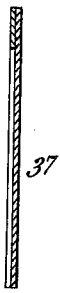
Fig. 3 is an end view of the construction illustrated by Fig. 2.
Figure 4:
Fig. 4 is a longitudinal edge view of the construction illustrated by Fig. 2.

As best illustrated by Fig. 2, the shields 31 and 33 for the gaskets 30 may each be constructed by superimposing one upon another, a plurality— two being here employed—of strips 37 of thin sheet material each having recesses 38 cut inwardly from opposite edges or margins 39 and extending thereacross distances only slightly less than the width of the strips so as to terminate at points 40 closely adjacent the edges of the strips opposite those which are interrupted by the recesses.

It will be obvious from inspection of the portion of one of the strips of material from which the shields are made, as illustrated at the right-hand end of Fig. 2, that the alternately disposed recesses are so formed, dimensioned and relatively positioned as to render what remains of the ribbon-like strip of material extensible lengthwise and flexible laterally in either direction. It will also be obvious that by making the width of each recess slightly less than the widths of the body portions 41 of the strip between the recesses, two of the recessed strips may be superimposed one upon the other with the centers of the recesses of one strip in registration with the centers of the body portions of the other in such manner that each recess will be covered and closed by a body portion, as a result of which a shield made up of two such superimposed strips will have an uninterrupted or imperforate surface.

A shield 31 for the gasket 30 comprising a pair of superimposed elements such as are illustrated in Fig. 2 will satisfactorily prevent cold flow or extrusion of the plastic body portion of the gasket through the shield into the joint 32 (Fig. 5) when subjected to great pressure, and will at the same time prevent highly heated fluids or injurious chemicals from gaining access to the surface of the gasket underlying the shield 31 which would otherwise be exposed at the joint 32.

Likewise, a shield 33 for the gasket 30 built up of superimposed strips such as are illustrated by Fig. 2 affords satisfactory protection against extrusion at the joints 36 and 35 (see Fig. 5) when the clamping rings 22 are drawn up tightly by the bolts 23 in order to force the gaskets 30 into the channels between the surfaces 28 and 27 of the pipe ends 20 and the coupling 21.

What has been referred to herein as the plastic body portion of the gasket 30 may be constructed of rubber composition or any other plastic or semi-plastic material of similar physical characteristics.

As will be obvious, the gasket may be constructed in the form of a continuous annular packing ring, or the gasket material may be made up in coils of stock from which lengths of proper dimensions may be so cut as to form packing rings having overlapping ends or ends which meet along diagonal planes in a manner well known in the art.

The elements 37 from which the shields 31 and 33 are constructed may be made of brass, copper, bronze, or any other material of strength sufficient to serve the intended purpose of preventing extrusion of the underlying plastic material, of protecting the plastic material from damage resulting from exposure to fluids of high temperature or fluids containing injurious chemicals, and of otherwise withstanding exacting conditions of service during shipment, storage and use to which the gasket may be subjected.

It should be apparent from the foregoing description that a gasket provided with shields constructed in accordance with the herein disclosed invention will be substantially as flexible as one made of rubber composition or similar plastic or semi-plastic material alone, thus adapting it to yield or change its form to the required degree when being assembled with pipe ends, couplings or other elements of a joint to be sealed and forced into engagement with opposing surfaces and maintained in such engagement under a desired degree of pressure.

The invention is not intended to be limited to the specific form herein selected and disclosed for purposes of illustration, but should be regarded as including variations and modifications thereof within the scope of the appended claims.

What is claimed is:

1. An armored gasket comprising a body portion of plastic material and a flexible shield, applied to and extended along a portion of its surface, the said shield comprising a plurality of strips of protective sheet material each having recesses extending inwardly in alternation from its opposite edges and of depths but little less than the width of the strip so as to render it both longitudinally extensible and laterally flexible, the strips being superimposed with the gaps in their margins in registration with marginal body portions so that the shield will be continuous and uninterrupted along both of its edges.

2. An armored gasket comprising a body portion of plastic material and a flexible shield, applied to and extended along a portion of its surface including a relatively narrow zone designed to withstand exacting conditions of service exceeding those to which other parts need be subjected, the said shield comprising a plurality of strips of protective sheet material each having recesses extending inwardly in alternation from its opposite edges and of depths but little less than the width of the strip so as to render it both longitudinally extensible and laterally flexible, the strips being superimposed with their recessed portions in registration with body portions, so as to provide a substantially imperforate covering for the portion of the plastic material to which the shield is applied.

3. An armored gasket, as defined by claim 2, of which the recesses in the component elements of the shield are of narrower widths than the intervening body portions, so that when superimposed the elements will provide an imperforate protector for the underlying plastic material.

4. An armored gasket, as defined by claim 2, of which the plastic body portion has a wedge-like part adapted to be forced into a joint between two parts to be sealed, and of which the shield is so applied as to extend along and cover the entering marginal portion of the said wedge-like part and adjacent portions of its convergent surfaces, with the recesses of its component elements disposed transversely with respect thereto.

5. An armored gasket, as defined by claim 2, of which the plastic body portion has two relatively narrow, parallel zones each designed to withstand exacting conditions of service exceeding those to which other parts need be subjected and an intermediate zone adapted to be subjected to the pressure of a gasket-clamping element, and of which the shield is so applied as to extend along and cover the three aforesaid zones with the recesses of its component elements disposed transversely with respect thereto.

CECIL R. HUBBARD.